(12) United States Patent
Paisley et al.

(10) Patent No.: US 11,401,903 B2
(45) Date of Patent: Aug. 2, 2022

(54) METHODS AND SYSTEMS FOR AN ENGINE

(71) Applicant: Ford Global Technologies, LLC, Dearborn, MI (US)

(72) Inventors: Gary Paisley, Romford (GB); Hank Kwong, Farmington Hills, MI (US); Dilli Poudel, Chigwell (GB); Chris Edward Pedlar, Chelmsford (GB); David Hesketh, Ingatestone (GB)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 16/933,074

(22) Filed: Jul. 20, 2020

(65) Prior Publication Data
US 2021/0140400 A1 May 13, 2021

(30) Foreign Application Priority Data
Jul. 22, 2019 (GB) ...................................... 1910437

(51) Int. Cl.
*F02N 11/08* (2006.01)
*B60W 10/06* (2006.01)
(Continued)

(52) U.S. Cl.
CPC ......... *F02N 11/0822* (2013.01); *B60W 10/06* (2013.01); *B60W 20/00* (2013.01);
(Continued)

(58) Field of Classification Search
CPC ......... F02N 11/0822; F02N 2200/0802; F02N 2200/102; F02N 2200/103;
(Continued)

(56) References Cited

U.S. PATENT DOCUMENTS

| 2002/0074173 A1 | 6/2002 | Morimoto et al. |
| 2011/0137543 A1 | 6/2011 | Gibson et al. |

(Continued)

FOREIGN PATENT DOCUMENTS

| EP | 2302248 A2 * | 3/2011 | ............ B60W 10/02 |
| GB | 2427438 A | 12/2006 | |

(Continued)

OTHER PUBLICATIONS

Great Britain Intellectual Property Adminisliation, Combined Search and Examination Report under Sections 17 and 18 (3) Issued in Application No. GB1910437.1, dated Jan. 21, 2020, 9 pages.

*Primary Examiner* — George C Jin
(74) *Attorney, Agent, or Firm* — Vincent Mastrogiacomo; McCoy Russell LLP

(57) ABSTRACT

Methods and systems are provided for an engine. In one example, a method of operating an engine of a vehicle, the vehicle comprising a brake pedal, a clutch pedal and a transmission having a neutral position and at least one in-gear position, comprises starting the engine if either the brake pedal of the vehicle is released or the transmission has been in neutral for a predetermined period of time, and the clutch pedal of the vehicle is depressed concurrently with the transmission being moved out of the neutral position into an in-gear position.

20 Claims, 3 Drawing Sheets

(51) Int. Cl.
  *B60W 20/00*    (2016.01)
  *F16H 63/50*    (2006.01)
  *G08G 1/00*    (2006.01)
(52) U.S. Cl.
  CPC .............. *F16H 63/50* (2013.01); *G08G 1/22*
    (2013.01); *B60W 2510/1005* (2013.01); *B60W*
    *2540/12* (2013.01); *B60W 2540/14* (2013.01);
    *B60W 2555/20* (2020.02); *F02N 2200/0802*
    (2013.01); *F02N 2200/102* (2013.01); *F02N*
    *2200/103* (2013.01); *F02N 2200/105*
    (2013.01); *F02N 2200/12* (2013.01)
(58) Field of Classification Search
  CPC ........... F02N 2200/105; F02N 2200/12; F02N
    2300/2011; B60W 10/06; B60W 20/00;
    B60W 2540/12; B60W 2540/14; B60W
    2510/1005; B60W 2555/20; F16H 63/50;
    G08G 1/22
  See application file for complete search history.

(56) References Cited

U.S. PATENT DOCUMENTS

| | | | |
|---|---|---|---|
| 2012/0196723 A1 | 8/2012 | Christen et al. | |
| 2016/0230736 A1* | 8/2016 | Hosaka | F02N 11/103 |
| 2017/0356415 A1* | 12/2017 | Khafagy | B60K 6/48 |

FOREIGN PATENT DOCUMENTS

| | | | |
|---|---|---|---|
| GB | 2427443 A | 12/2006 | |
| GB | 2427485 A | 12/2006 | |

\* cited by examiner

METHODS AND SYSTEMS FOR AN ENGINE

CROSS REFERENCE TO RELATED APPLICATIONS

The present application claims priority to Great Britain Patent Application No. 1910437.1 filed on Jul. 22, 2019. The entire contents of the above-listed application 5 is hereby incorporated by reference for all purposes.

FIELD

The present description relates generally to a start/stop feature of an engine.

BACKGROUND/SUMMARY

Some vehicle engines may be automatically switched off under certain engine stop conditions. For example, one engine stop condition may be to automatically switch the engine off if the vehicle is not moving. When stopped, the engine may automatically start again under certain start conditions. These auto start-stop systems may be configured to reduce the fuel consumption and $CO_2$ emissions of the vehicle by automatically shutting down the engine when (according to certain conditions) it is determined that it is not desired to keep the engine running.

In one example, a vehicle engine such as an internal combustion engine (ICE), is started during an auto-stop if one of the brake pedal is released or if the transmission has been in neutral for a period of time, and if the clutch pedal is depressed concurrently with the transmission being moved out of the neutral position into an in-gear position. For example, the clutch pedal may be depressed at the instant of the transmission coming out of neutral.

Accordingly, one example of this disclosure relates to a method of operating an engine (e.g. an ICE) of a vehicle, the vehicle comprising a brake pedal, a clutch pedal and a transmission having a neutral position and at least one in-gear position, the method comprising starting the engine if either the brake pedal of the vehicle is released or the transmission has been in neutral for a predetermined period of time, and the clutch pedal of the vehicle is depressed concurrently with the transmission being moved out of the neutral position into an in-gear position.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
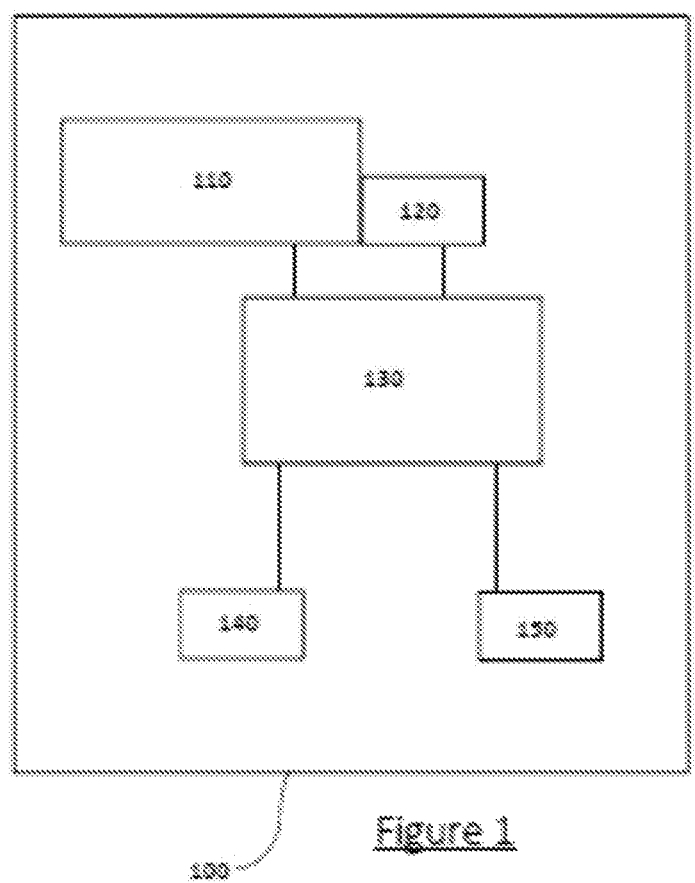
FIG. 1 illustrates a schematic of a hybrid vehicle.

The following description relates to a method of operating an engine (e.g. an ICE) of a vehicle, the vehicle comprising a brake pedal, a clutch pedal and a transmission having a neutral position and at least one in-gear position. The method comprises starting the engine if either the brake pedal of the vehicle is released or the transmission has been in neutral for a predetermined period of time, and the clutch pedal of the vehicle is depressed concurrently with the transmission being moved out of the neutral position into an in-gear position.

Therefore, according to these examples, if a vehicle came to a stop with the transmission in-gear and the engine was automatically stopped, and if the driver then decided to move the vehicle and, consequently, downshifted to first gear, then the engine would automatically start if, concurrently with the clutch pedal being depressed, the transmission was moved out of neutral (and into first gear) and either the brake pedal is released or the brake pedal remains depressed but the transmission has been in neutral for a sufficient period of time (e.g. for a time exceeding a minimum time threshold).

Examples of this disclosure therefore may address certain conditions that lead to automatic restart issues including where a driver has come to a halt while in a high gear (e.g. a gear other than first) and the engine has been automatically stopped. When downshifting to first gear to move the vehicle, the driver releases the brake while the transmission is still in neutral. In this case, some auto start-stop systems may not restart the engine because these systems sense the brake pedal being released while the transmission is in neutral. In this case, any gear engagement logic (e.g. present in such a system) may also not trigger the engine to auto-start since the transmission may not have been in the neutral position for long enough to trigger an engine start according to instructions stored on a controller. In contrast, as shown in the present disclosure, if the transmission is in neutral for long enough (for a period of time exceeding a threshold) then shifting into gear triggers an engine restart regardless of the state of the brake pedal. In other words, examples of this disclosure may therefore automatically start a stopped engine when the transmission is moved into an in-gear position (e.g. into first gear) even though the brake is still pressed, if the transmission has been in neutral for a sufficient period of time.

Accordingly, the method described above may further comprise starting a timer when the transmission is moved into the neutral position and then determining, using the timer, the amount of time the transmission is in neutral. The method may also further comprise comparing the amount of time the transmission is in neutral to the predetermined time threshold and, if the time exceeds the threshold and, if the clutch pedal of the vehicle is depressed concurrently with the transmission being moved out of the neutral position into an in-gear position, starting the engine.

According to another example of this disclosure there is provided a vehicle. The vehicle comprises a brake pedal, a clutch pedal, a transmission having a neutral position and at least one in-gear position, and a control unit. The control unit is configured to start the engine if either the brake pedal of the vehicle is released or the transmission has been in neutral for a predetermined period of time, and the clutch pedal of the vehicle is depressed concurrently with the transmission being moved out of the neutral position into an in-gear position.

The vehicle may further comprise at least one of a brake pedal sensor configured to determine a state and/or a position of the brake pedal, a clutch pedal sensor configured to determine a state and/or a position of the clutch pedal, and a transmission sensor configured to determine a state and/or a gear of the transmission.

The control unit may be configured to receive data from the brake pedal sensor, the clutch pedal sensor and the transmission sensor. The control unit may be configured to receive feedback from the brake pedal sensor, the clutch pedal sensor, and the transmission sensor to determine a state of the brake pedal, determine a state of the clutch pedal, and determine a state of the transmission, respectively.

The vehicle may further comprise a timer to determine the amount of time the transmission is in neutral. The control unit may comprise the timer. In either example, the control unit may be configured to compare the amount of time the transmission is in neutral to the predetermined time threshold and, if the time exceeds the threshold and, if the clutch pedal of the vehicle is depressed concurrently with the transmission being moved out of the neutral position into an in-gear position, start the engine.

According to another example there is provided a non-transitory machine-readable storage medium, encoded with instructions executable by a processor, the machine-readable storage medium comprising instructions to, when executed by the processor, cause the processor to perform the method as described above. For example, the instructions, when executed by the processor, may cause the processor to start an engine of a vehicle if either a brake pedal of the vehicle is released or a transmission of the vehicle has been in a neutral position for a predetermined period of time, and a clutch pedal of the vehicle is depressed concurrently with the transmission being moved out of the neutral position into an in-gear position. The electronic control unit as described above may comprise the processor.

The predetermined period of time may be 2.5 seconds, or substantially 2.5 seconds. Additionally or alternatively, the predetermined period of time (e.g., threshold time) may be tuned over time based on driver behavior. In one example, the predetermined period of time may increase in response to more aggressive behaviors and decrease in response to less aggressive behaviors. More aggressive behaviors include higher pressure braking pedal actuations, higher pressure accelerator pedals actuations, higher vehicles speeds, and the like.

In one example, the restart is event driven but may also be dependent on an amount of time the transmission was previously in neutral. If the transmission was not in neutral for a long enough period of time, the shifting out of neutral and into a gear with the brake pedal pressed would not trigger a restart, thereby allowing a downshift case to work. However, if the transmission was in neutral for a long enough period of time, then shifting into gear may trigger an engine restart regardless (e.g., independent of) of the brake pressed/unpressed status, thereby catering a larger range of driver behaviors.

FIG. 1 shows an example vehicle 100, e.g. a motor vehicle. The vehicle 100 comprises an engine 110 (e.g. an internal combustion engine) operably connected to a transmission 120. For example, the engine 110 may be driving the transmission 120 and/or the transmission 120 may be a multi-speed transmission. The transmission 120 may be drivably connected to the engine 110 by a (not-shown) clutch which may be manually engaged or released by a driver of the vehicle 100 and may comprise a (also not shown) gear selector. The gear selector may be movable between several positions including at least one in-gear position, where a gear forming part of the transmission is selected, and a neutral position in which no gear is selected.

When the gear is moved to the neutral position the transmission 120 is said to be in a neutral state (or "in neutral") in which drive from the engine 110 cannot be transmitted by the transmission. When the gear selector is moved to an in-gear position the transmission is said to be in an in-gear state (or "in-gear") in which drive from the engine 110 can be transmitted by the transmission.

The vehicle 100 comprises a control unit 130 (e.g. an electronic control unit, or ECU), a brake pedal 140, and a clutch pedal 150. The control unit 130 is configured to monitor the state of the transmission 120. For example, the control unit 130 is configured to measure, monitor, and/or determine whether the transmission 120 is in a neutral state or an in-gear state. Similarly, the control unit 130 is configured to measure, monitor, and/or determine the position of the brake pedal 140 and the clutch pedal 150 to determine whether the pedals 140, 150 are depressed, or released (from being depressed). For example, the control unit 130 is configured to give an indication of when the brake pedal 140 and clutch pedals 150 are being pressed. In one example, the brake pedal and/or clutch pedal may be determined (e.g. by the control unit 130) to be in a pressed state when they are not in an unpressed state (e.g., declined and inclined positions, respectively). In this example, a pressure applied to the pedal(s) by a user will lead to a determination that the pedal is pressed. In another example, the pedal(s) may be determined to be in a pressed state when they reach a certain percentage of their maximum travel. For example, the travel of the brake and clutch pedals may be said to be 0% when they are in an unpressed state. The pedals may be determined to be pressed when they reach a threshold percentage (e.g. 10%, 50%, 80% of their maximum travel distances etc.). In these examples, 0% of the maximum travel distance of the pedal represents the pedal being in an unpressed state. A position outside of the 0% maximum travel distance position may be determined to be a pressed position.

In one example, the brake and/or clutch pedals may be determined to be in the "pressed" state when they are (about, approximately, substantially) 100%. In this example each pedal is determined to be in the pressed state when the user is effectively pressing the pedal its maximum travel distance. In another example the pedal(s) may be determined to be in the pressed state when they are (about, approximately, substantially) 75% of their maximum travel.

The control unit 130 may determine that one (or both) of the pedals have been released when the pedal(s) move to a lower travel and/or lower percentage of maximum travel (e.g. towards 0%, e.g. towards the unpressed state). This may indicate that a user is applying less pressure to the pedal(s). In one example, the pedal(s) may be determined to have been released when they move by a certain percentage of their maximum travel towards the unpressed state. For example, if the brake or clutch pedals move 5% or greater of their maximum travel towards the un-pressed, 0%, state then the control unit 130 may determine that the pedal has been released.

In one example, the control unit 130 may determine whether the brake pedal is in one of two states—a "fully released" state or a "not fully released state". The not fully released state may be a partially pressed, or a fully pressed state. The controller 130 may determine which one of these two states the brake pedal is in by monitoring the travel of the brake pedal. In one example, the controller 130 may determine that the brake pedal has transitioned from the not fully released state to the fully released state when the brake pedal has moved approximately 10% of its maximum travel (e.g. towards 0% of its maximum travel, or the unpressed position). In other words, the controller 130 may determine that the brake pedal is in the fully released state after it has moved 10% of its maximum travel (e.g. towards 0% of its maximum travel, or the unpressed position). In other words, the controller 130 may determine that the brake pedal is full released even though it is at a nonzero percentage of maximum travel (e.g. even if it is still pressed slightly) if it detects a movement of at least 10% towards the fully unpressed, 0% of maximum travel, state. This may result in that the brake pedal may be considered fully released at a time where the user's foot has released pressure on the pedal so that the pedal travels 10% of its travel even though the users foot may still exert some force on the brake pedal. According to this disclosure, "the brake pedal being released", (e.g. as determined in step 208 of the method of FIG. 2 to be described below) may be synonymous with the brake pedal being in its "fully released" state.

In one example, the control unit 130 may determine whether the clutch pedal is in one of two states—a "fully depressed" state or a "not fully depressed state". The fully depressed state may be a state in which the driveline is not transmitting any torque. The not fully depressed state may be a partially pressed, or a released state. The controller 130 may determine which one of these two states the clutch pedal is in by monitoring the travel of the clutch pedal. In one example, the controller 130 may determine that the clutch pedal is in the fully depressed state when its position is approximately 80% of its maximum travel distance. According to this disclosure, "the brake pedal being depressed", (e.g. as determined in steps 208 and 210 of the method of FIG. 2 to be described below) may be synonymous with the clutch pedal being in its "fully depressed" state.

Additionally or alternatively, the brake pedal and/or the clutch pedal may be determined to be fully released in response to a threshold rate of movement from the pressed position to the unpressed position. For example, if the brake pedal is released, its rate of movement is greater than the threshold rate of movement. However, if the brake pedal is pressed with less pressure by the vehicle operator, then the brake pedal may move at less than the threshold rate, thereby indicating the brake pedal is still being pressed and braking is still desired.

The control unit 130 is also configured to control the operation of the engine 110. For example, the control unit 130 may be operable to selectively start and stop the engine 110 without driver intervention, when one or more predetermined conditions exists. For example, the control unit 130 is configured to stop the engine 110 when one or more predetermined stop conditions exist. The predetermined conditions under which the control unit 130 is configured to stop the engine 110 will not be discussed here, as examples of this disclosure relate to predetermined "start" conditions. In other words, the control unit 130 is configured to start the engine 110 (e.g. the engine 110 in a stopped, e.g. an auto-stopped, state) when one or more predetermined start conditions exist.

That is to say, a vehicle 100 comprises a start/stop feature that allow the control unit 130 to activate/deactivate the engine 110 in response to a brake pedal position. As such, automatically starting the stopping the engine may be defined as the vehicle operator not actuating an actuator directly responsible for stopping or starting the engine. That is to say, the vehicle operator may depress the brake pedal wherein a stop may not occur.

Specifically, the control unit 130 is configured to start the engine 110 if either the brake pedal 140 is released or the transmission 120 has been in neutral for a predetermined period of time, and the clutch pedal 150 is depressed concurrently with the transmission 120 being moved out of the neutral position into an in-gear position.

In a first example, therefore, the control unit 130 is configured to start the engine 110 if the brake pedal 140 is released and the clutch pedal 150 is depressed concurrently with the transmission 120 being moved out of the neutral position into an in-gear position. As described above, the brake pedal being released may be determined by the brake pedal being in its "fully released" state (and, as described above, this may be determined when the brake pedal has moved 10% of its maximum travel towards the 0% pressed state).

In a second example, therefore, the control unit 130 is configured to start the engine 110 if the transmission 120 has been in neutral for a predetermined period of time, and the clutch pedal 150 is depressed concurrently with the transmission 120 being moved out of the neutral position into an in-gear position.

In either example, the clutch pedal being depressed may be determined by the clutch pedal being in its "fully depressed" state (and, as described above, this may be determined when the clutch pedal is at approximately 80% of its maximum travel).

The control unit 130 may therefore, monitor each of the brake and clutch pedals 140, 150, and the transmission 120. For example, the control unit 130 may be configured to monitor the transmission 120 and may be configured to determine whether the transmission is in a neutral state or is in-gear (and, if so, which gear). The control unit 130 may therefore be configured to determine the time that the transmission is in a neutral or in-gear state (e.g. the control unit 130 may comprise a timer for this purpose). The control unit 130 may be configured to monitor the position of the brake pedal and/or may be configured to determine whether an operator of the vehicle has applied pressure to the brake pedal to apply the brakes of the vehicle. For example, the control unit 130 may be configured to monitor the pressure of fluid in one or more brake lines. The control unit 130 may be configured to monitor the clutch pedal 150, for example the position of the clutch pedal 150. The control unit 130 may be configured to determine where the clutch pedal is toward either end of its direction of travel. In other words, the control unit 130 may be configured to determine whether the brake and clutch pedals are pressed, unpressed, or released. The control unit 130 may accordingly comprise a clutch pedal sensor and/or a brake pedal sensor and/or a transmission sensor (such as a gear selector or other sensor).

The control unit 130 may, in another example, receive signals from a number of sensors of the vehicle. For example, the vehicle 100 may comprise a transmission sensor (such as a gear selector or other sensor), a brake pedal sensor, and a clutch pedal sensor. The transmission sensor may be any sensor configured to sense the state of the transmission (e.g. to determine whether the transmission is in neutral or in-gear, and if so which gear). In other words, the transmission sensor may be any sensor configured to provide a feedback of whether the transmission is in gear or neutral. The transmission sensor may also comprise a timer configured to determine the time that the transmission is in a neutral or in an in-gear state. The brake pedal sensor may be any sensor configured to monitor the position of the brake pedal and/or to determine whether an operator of the vehicle has applied pressure to the brake pedal to apply the brakes of the vehicle. For example, the brake pedal sensor may be configured to monitor the pressure of fluid in one or more brake lines. The clutch pedal sensor may be configured to monitor the clutch pedal and to determine where the clutch pedal is toward either end of its direction of travel. In other words, the brake pedal sensor and clutch pedal sensors may respectively be configured to determine whether the brake and clutch pedals are pressed, un-pressed, or released.

Figure 2:
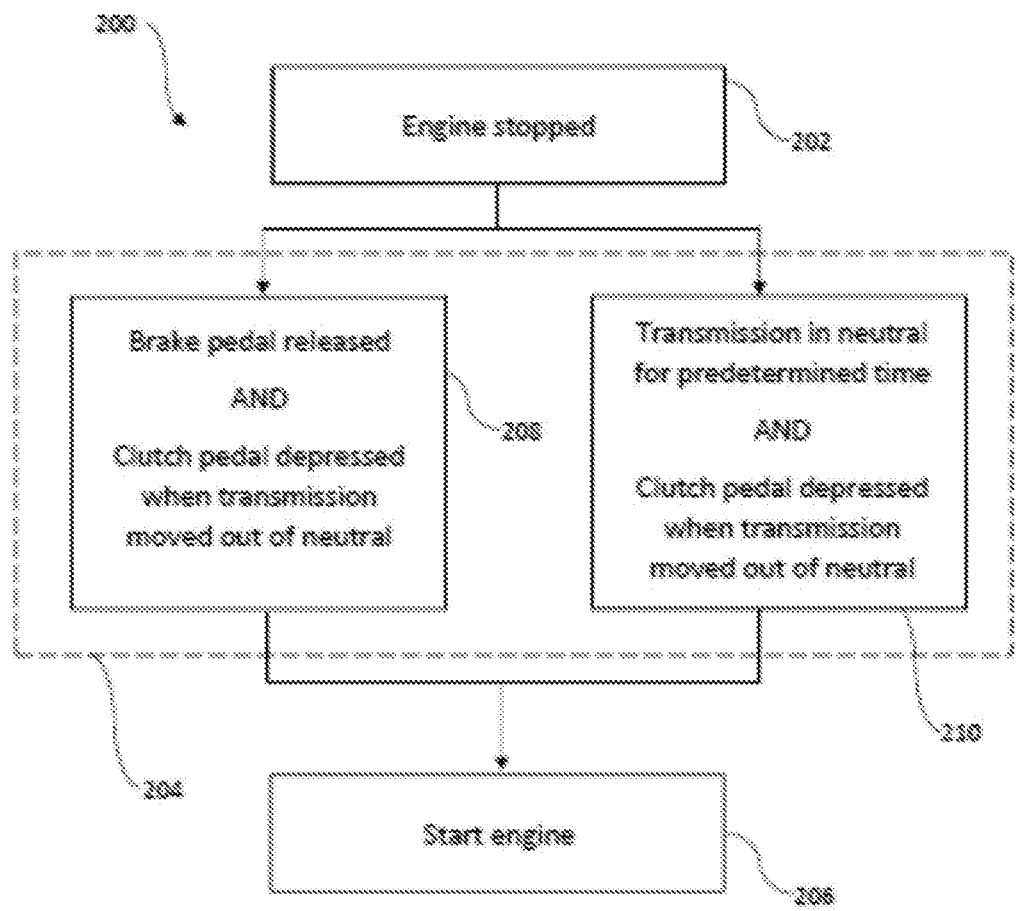
FIG. 2 illustrates a high level flow chart of a method.

FIG. 2 shows an example method 200 of operating an engine. The engine may be the engine 110 of the example vehicle shown in FIG. 1 and the control unit 130 of the FIG. 1 example may be configured to perform the method 200 of FIG. 2. That is to say, instructions for carrying out method 200 and the rest of the methods included herein may be executed by a controller (e.g. control unit 130) based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 comprises step 202 at which the engine is in a stopped state (e.g. an automatically stopped state such as a state following the meeting of at least one preconditioned stop condition). Conditions for the automatic stop to occur may include one or more of the vehicle being stationary, the brake pedal being depressed, and an accelerator being in an unpressed position. The engine will remain in the stopped state until one or more specific predetermined engine start conditions are met—these are set forth in step 204. If one of the predetermined engine start conditions are met then the method advances to step 206 at which the engine is started (as the engine has been in a stopped state, at step 202, step 206 may therefore comprise re-starting the engine). As stated above, in one example the engine, at step 202, may be in the stopped state as a result of auto-stopping, e.g. in an auto-stopped state, and therefore method 200 may be a method of operating an engine while the engine is operating in a stop-start mode, in which the engine may be selectively stopped and started (e.g. by the control unit 130), according to whether one or more (stop or start) conditions exist. If one of the two start conditions (step 204) are met then the engine is started.

At step 204 two separate engine start conditions are used to determine if the engine should be restarted. If neither of these conditions are met, then the method 200 maintains the engine being stopped. The first of these conditions is indicated as step 208 and comprises a determination of whether the brake pedal of the vehicle is released and whether the clutch pedal of the vehicle is depressed concurrently with the transmission being moved out of the neutral position into an in-gear position. If it is determined (e.g. by the control unit 130, in one example utilizing signals from a brake pedal sensor and/or a clutch pedal sensor and/or a transmission sensor) that this is the case then the method advances to step 206 at which the engine is restarted. Otherwise, the method remains at step 202 (with the engine stopped) until this condition or the other condition is met. The second of the predetermined start conditions is indicated at step 210 and comprises a determination of whether the transmission has been in neutral for a predetermined period of time and whether the clutch pedal of the vehicle is depressed concurrently with the transmission being moved out of the neutral position into an in-gear position. If it is determined (e.g. by the control unit 130, in one example utilizing signals from a brake pedal sensor and/or a clutch pedal sensor and/or a transmission sensor) that this is the case then the method advances to step 206 at which the engine is restarted. Otherwise, the method remains at step 202 (with the engine stopped) until this condition or the other condition is met.

Figure 3:
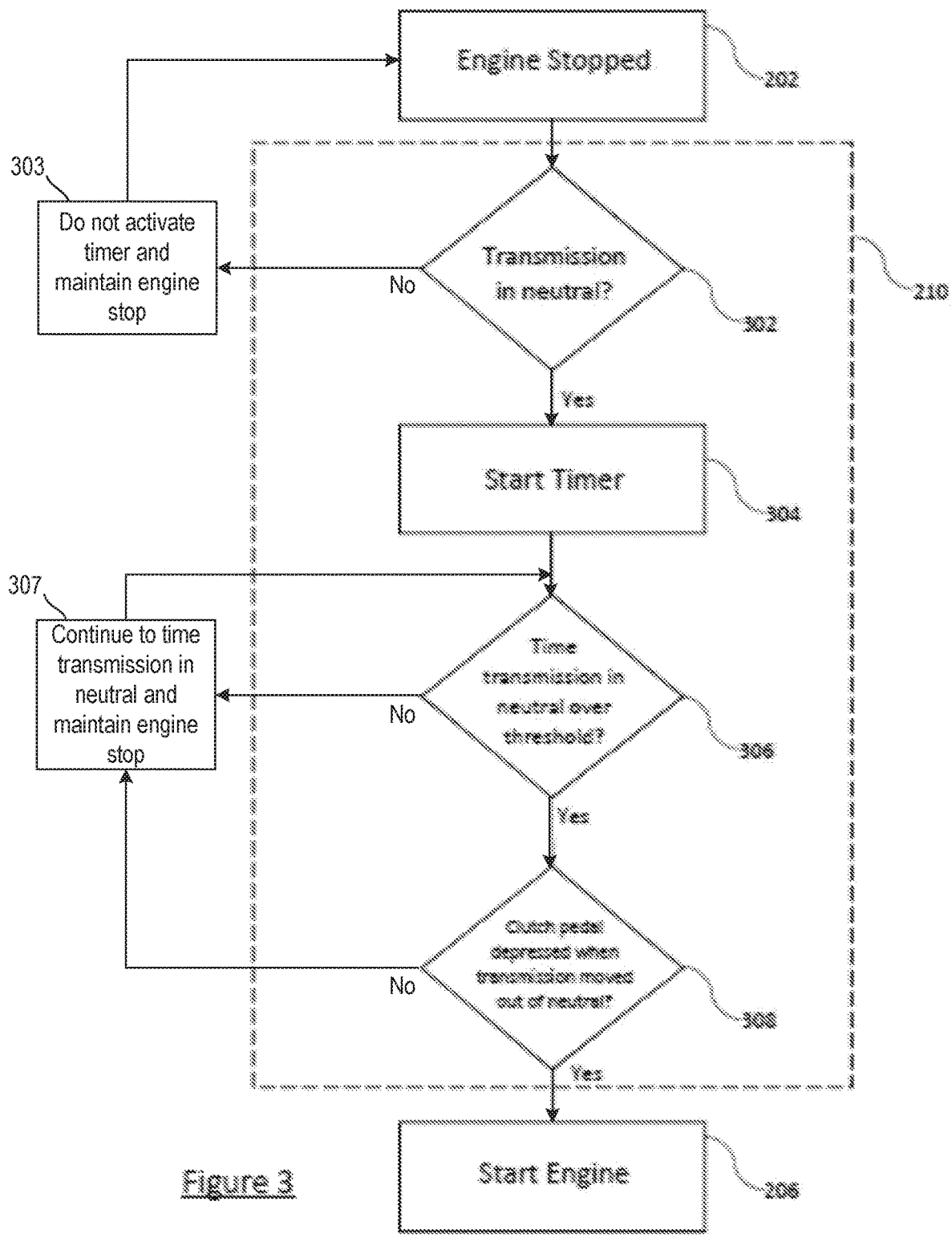
FIG. 3 illustrates a flowchart of a portion of the method.

FIG. 3 shows part of the method 200 in further detail, when the engine start condition 210 triggers an engine restart. In other words, FIG. 3 shows an example implementation of the engine start condition 210 of FIG. 2. FIG. 3 shows that once, the engine is stopped at 202 it is then determined (step 302) whether the transmission is in neutral. If the transmission is in neutral, then a timer is started (step 304). For example, the time may be configured to commence counting as soon as the transmission is in neutral. If the transmission is not in neutral, then a timer is not started at 303. As indicated in steps 306 and 308, if the timer indicates that the transmission has been in neutral for a predetermined period of time (step 306), and the clutch pedal of the vehicle is depressed concurrently with the transmission being moved out of the neutral position into an in-gear position (step 308), then the engine is restarted at step 206. It will be appreciated that the order in which the steps 306, 308 are depicted in FIG. 3 are for illustrative purposes only and, in practice, may be performed in the opposite order to that depicted or concurrently. As such, if the transmission is not in neutral for an amount of time greater than the threshold time or if the clutch pedal is not depressed, then the restart may not be initiated and the engine stop may be maintained at 307.

Referring back to FIG. 1, the duration of the pre-determined period of time may be variable, for example, user-settable and changeable. In other words, the control unit 130 may comprise a timer (e.g. the one started at step 304) and a user may set the predetermined period of time the transmission is to be in neutral for, if the clutch pedal is depressed concurrently with the transmission coming out of neutral, the engine to start. The predetermined period of time may be a time threshold, and the control unit 130 may comprise a database to store the time threshold. The control unit 130 may comprise the timer to time how long the transmission is in neutral and may be configured to compare this time with the time threshold. Accordingly, if the control unit 130 determines that the time the transmission is in neutral is over the time threshold, and if the clutch pedal is depressed concurrently with the transmission coming out of neutral, the control unit 130 is configured to start the engine.

Referring back to FIG. 3, step 306 may therefore comprise comparing the time (recorded by the time started at 304) to the (predetermined) time threshold and if the recorded time is greater than the threshold then the engine is stopped (at step 206) if the other condition (at step 308) is satisfied.

The predetermined time may be set by a user (e.g. a user may operate the control unit 130 to change the predetermined time, or time threshold) or may be learned from driver behavior. In this latter example, the predetermined time may be learned from the behavior of a driver, or drivers, of the vehicle 100, or may be learned from a plurality of drivers each driving a different vehicle. For example, a fleet of vehicles may form a connected network and the behavior of a plurality of drivers may be monitored to determine an appropriate time duration to set as the predetermined threshold. In these examples the time may be an average time over a (predetermined) number of cycles/occurrences. For example, the time may be set by a controller and may be machine-learned. The time may be based on the analysis of a number of real-world drive events during vehicle deployment, and may be based on both expert and non-expert drivers. Accordingly, the time may be an average time. In one example the time may be 2.5 seconds, or substantially, approximately and/or about 2.5 seconds.

In one example, the time threshold is based on an average time gathered from a plurality of vehicles executing an engine stop at a given location. Additionally or alternatively, the average time may be categorized based on a time of day, driver behavior, weather, and the like. For example, if the time of day corresponds to a time of day associated with high amount of traffic, then the time threshold may be greater than a time threshold corresponding to a time of day with less traffic.

Figure 4:
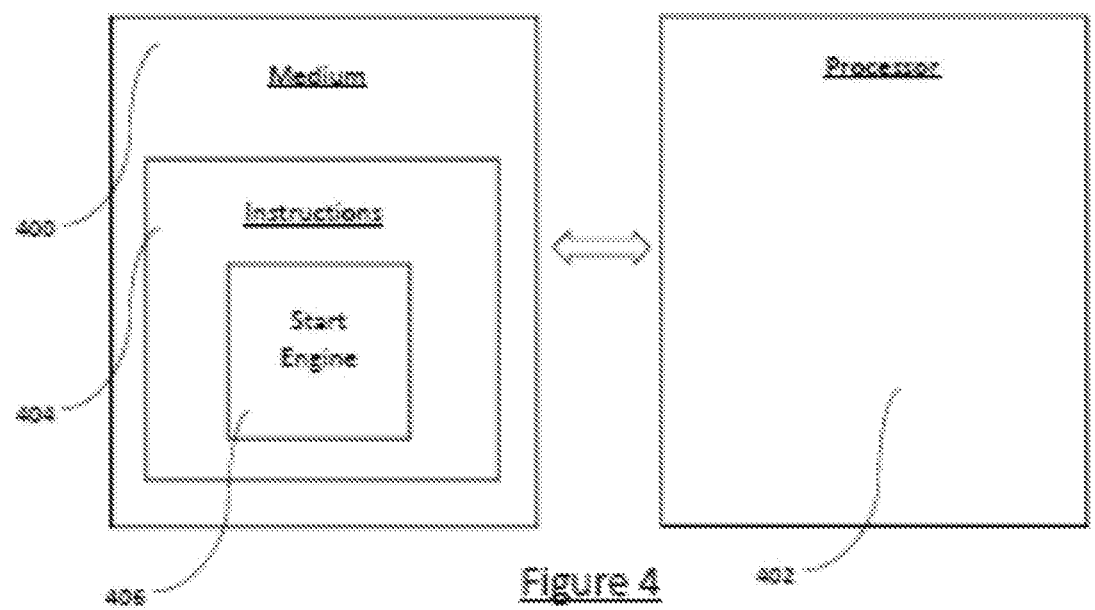
FIG. 4 illustrates a machine-readable medium in association with a processor.

FIG. 4 shows an example non-transitory machine-readable storage medium 400 and a processor 402. The medium 400 is encoded with instructions 404 that are executable by the processor 402. When executed by the processor, the instructions cause the processor to perform the method 200 as described above with reference to FIG. 2. For example, the instructions 404 comprise instructions 406 to cause the processor 402 to start an engine of a vehicle if either a brake pedal of the vehicle is released or a transmission of the vehicle has been in a neutral position for a predetermined period of time, and a clutch pedal of the vehicle is depressed concurrently with the transmission being moved out of the neutral position into an in-gear position. An electronic control unit of a vehicle may comprise the processor. The brake pedal 140, clutch pedal 150, transmission 120, engine 110, electronic control unit 130 and/or vehicle 100 may be as described above with reference to FIG. 100.

In this way, a vehicle may comprise a more responsive start/stop feature. The technical effect of monitoring a time elapsed with the transmission in neutral during an engine stop and/or a clutch pedal being depressed is to more quickly start the engine out of the engine stop. By monitoring these conditions, a driving experienced may be enhanced relative to other examples of start/stop features.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method operating an engine of a vehicle, the vehicle comprising a brake pedal, a clutch pedal and a transmission having a neutral position and at least one in-gear position, the method, comprising:
   starting a time when the transmission is moved into the neutral position during an engine stop;
   determining an amount of time the transmission is in neutral; and
   starting the engine from a stop in response to the clutch pedal of the vehicle being depressed concurrently with the transmission being moved out of the neutral position into an in-gear position, wherein the transmission has been in neutral for a predetermined period of time.

2. The method of claim 1 further comprising comparing the amount of time the transmission is in neutral to the predetermined time threshold and, starting the engine if the time exceeds the predetermined period of time and, if the clutch pedal of the vehicle is depressed with the transmission being moved out of the neutral position into an in-gear position.

3. The method of claim 1, wherein the predetermined period of time is 2.5 seconds.

4. The method of claim 1, wherein the predetermined period of time is an average calculated based on feedback from a plurality of vehicles.

5. A vehicle comprising:
   a brake pedal;
   a clutch pedal,
   a transmission having a neutral position and at least one in-gear position; and
   a control unit having instructions stored on non-transitory memory thereof that when executed enable the control unit to:
   stop an engine in response to a brake pedal being depressed, an accelerator pedal being released, and the vehicle being stationary;
   activate a timer in response to the transmission moving to the neutral position; and
   start the engine in response to the clutch pedal of the vehicle being depressed and the transmission being moved out of the neutral position into the at least one in-gear position following a threshold time independent of a position of the brake pedal.

6. The vehicle of claim 5, further comprising a brake pedal sensor configured to determine the position of the brake pedal, a clutch pedal sensor configured to determine a position of the clutch pedal, and a transmission sensor configured to determine a position of the transmission.

7. The vehicle of claim 6, wherein the control unit is configured to receive data from the brake pedal sensor, the clutch pedal sensor, and the transmission sensor.

8. The vehicle of claim 5, wherein the threshold time is associated with a single location.

9. The vehicle of claim 8, wherein the threshold time is calculated based on feedback from a plurality of vehicles stopped at the single location.

10. The vehicle of claim 5, wherein the threshold time is based on one or more of a time of day, a location, weather, and a driver behavior.

11. The vehicle of claim 5, wherein the vehicle is a hybrid vehicle.

12. A system, comprising:
an engine;
a transmission having a neutral position a plurality of driving gears;
a clutch pedal and a clutch pedal sensor configured to sense a position of the clutch pedal;
a brake pedal and a brake pedal sensor configured to sense a position of the brake pedal; and
a controller comprising instructions stored on non-transitory thereof that when executed enable the controller to:
stop the engine in response to the brake pedal being depressed, an accelerator pedal being released, and the vehicle being stationary;
activate a timer in response to the transmission moving to the neutral position; and
start the engine in response to the clutch pedal of the vehicle being depressed and the transmission being moved out of the neutral position into one of the plurality of driving gears following a threshold time independent of the position of the brake pedal, wherein the threshold time is a dynamic.

13. The system of claim 12, wherein the threshold time is based on feedback from vehicles of a vehicle fleet, wherein the threshold time is a threshold time of a plurality of threshold times, wherein each threshold time of the plurality of threshold times corresponds to a location.

14. The system of claim 13, wherein the location comprises a plurality of location times, each location time categorized by weather, time of day, and driver behavior.

15. The system of claim 12, wherein the instructions further enable the controller to maintain the stop in response to a time tracked by the timer being less than the threshold time.

16. The system of claim 12, wherein the brake pedal being released comprises the brake pedal moving to an unpressed position.

17. The system of claim 16, wherein the brake pedal moves to the unpressed position at a threshold rate.

18. The system of claim 12, wherein the clutch pedal being depressed comprises the clutch pedal moving out of an unpressed position.

19. The system of claim 18, wherein the clutch pedal moves a threshold distance out of the unpressed position.

20. The system of claim 12, wherein the brake pedal is unpressed or pressed when the engine is started.

* * * * *